United States Patent [19]
Butkovich et al.

[11] Patent Number: 6,038,936
[45] Date of Patent: Mar. 21, 2000

[54] DUAL SPEED PTO SHAFT RETENTION AND SUPPORT SYSTEM

[75] Inventors: George M. Butkovich, Lemont; Vladimir Shubinsky, Northbrook, both of Ill.

[73] Assignee: Case Corporation, Racine, Wis.

[21] Appl. No.: 09/187,843

[22] Filed: Nov. 6, 1998

[51] Int. Cl.$^7$ ............................. B60K 17/28; B25G 3/12
[52] U.S. Cl. ...................... 74/15.4; 29/401.1; 192/48.91; 403/2; 403/348
[58] Field of Search ................... 74/11, 15.4; 192/48.91; 403/2, 348; 29/401.1

[56] References Cited

U.S. PATENT DOCUMENTS

| | | |
|---|---|---|
| 1,765,959 | 6/1930 | Worcester . |
| 2,388,186 | 10/1945 | Rowsey . |
| 2,585,113 | 2/1952 | Gredell . |
| 2,680,359 | 6/1954 | Bowers . |
| 2,739,463 | 3/1956 | Pfister et al. . |
| 2,748,578 | 6/1956 | Potts . |
| 2,773,369 | 12/1956 | Klemm . |
| 2,968,188 | 1/1961 | Du Shane et al. . |
| 3,213,712 | 10/1965 | Swift . |
| 3,261,222 | 7/1966 | Fresmann et al. . |
| 3,279,275 | 10/1966 | Christie . |
| 3,352,165 | 11/1967 | Lee . |
| 3,405,451 | 10/1968 | Fukano et al. . |
| 3,513,712 | 5/1970 | Zajichek et al. . |
| 3,561,277 | 2/1971 | Boyle et al. . |
| 3,675,497 | 7/1972 | Thomas . |
| 4,271,942 | 6/1981 | Ballendux . |
| 4,287,778 | 9/1981 | Quick . |
| 4,292,819 | 10/1981 | van der Lely et al. . |
| 4,347,715 | 9/1982 | Carman et al. . |
| 4,722,234 | 2/1988 | Greene et al. . |
| 4,776,226 | 10/1988 | Zenker . |
| 5,494,142 | 2/1996 | Kale . |
| 5,658,087 | 8/1997 | Butkovich et al. . |
| 5,667,330 | 9/1997 | Henkel et al. . |

*Primary Examiner*—Allan D. Herrmann
*Attorney, Agent, or Firm*—Foley & Lardner

[57] ABSTRACT

An apparatus and method is disclosed for retaining a first and second PTO in longitudinal relation to an output sleeve in an agricultural vehicle. The output sleeve is for interchangeably supporting and transmitting rotational power to the first and second PTOs, and includes an outward protrusion proximate an end of the output sleeve. The apparatus includes an outer plate with an outer plate aperture such that the outer plate can be longitudinally positioned onto the first PTO behind a shoulder on the first PTO. The apparatus also includes an inner plate with an inner plate aperture such that the inner plate can be longitudinally positioned onto the output sleeve, and an inward protrusion into the inner plate aperture. The inward protrusion prevents removal of the inner plate from the output sleeve if, after the inward protrusion has been moved longitudinally past the outward protrusion, the inner plate is rotated with respect to the output sleeve so that the inward protrusion is in front of the outward protrusion. The apparatus further includes a fastener that couples the outer plate to the inner plate. Also disclosed is a bearing support assembly that includes a housing assembly, a bearing sleeve and a plurality of bearings. Further disclosed is a sensor for sensing the movement of teeth on the inner plate or on the bearing sleeve.

30 Claims, 6 Drawing Sheets

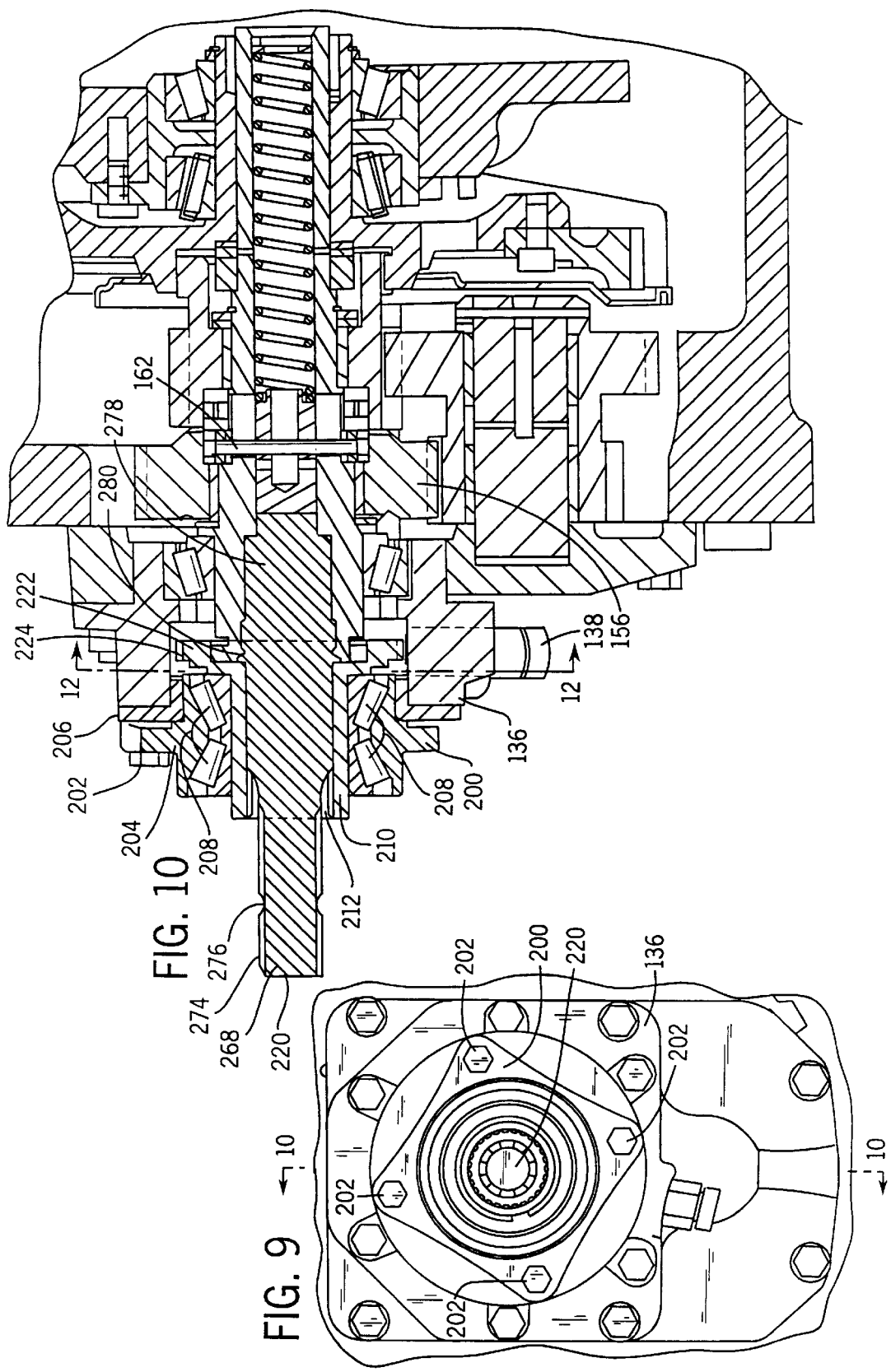

DUAL SPEED PTO SHAFT RETENTION AND SUPPORT SYSTEM

FIELD OF THE INVENTION

The present invention relates to an apparatus and a method for retaining power take-off shafts on an agricultural vehicle. The present invention further relates to an apparatus and a method for providing support for PTO shafts on an agricultural vehicle and for determining the identity and speed of such PTO shafts.

BACKGROUND OF THE INVENTION

Agricultural vehicles such as tractors often are attached to one or more driven devices that require power in order to operate. Such devices may include equipment or implements such as mowers and spreaders. Commonly, the agricultural vehicles provide power to these attached devices by way of power take-off shafts (PTOs). These PTOs allow rotational power to be transmitted from the agricultural vehicles to the attached devices when input (or implement) shafts of the attached devices are coupled to the PTOs.

As the use of PTOs developed, most tractor manufacturers standardized on operating PTOs at either 540 RPM or 1000 RPM. In addition, manufacturers standardized the sizes (particularly the diameters and lengths) of PTOs and standardized the output spline arrangements of PTOs. (The output splines along the PTOs provide the transfer of torque between the PTOs and the input shafts of the attached devices and determine whether a particular attached device may be attached to a particular PTO.) Three PTO standards that are of interest because of their common implementation on tractors are (1) a 1⅜" PTO operating at 540 RPM, (2) a 1⅜" PTO operating at 1000 RPM, and (3) a 1¾" PTO operating at 1000 RPM (where 1⅜" and 1¾" refer to the diameter of that portion of a PTO where the PTO interfaces an attached device).

While earlier agricultural vehicles only provided a single PTO (e.g., a 1⅜" PTO operating 540 RPM), recent agricultural vehicles have flexible PTO output systems that allow the vehicles to provide multiple PTOs. For example, a tractor may have two or more PTOs, each at a different PTO standard. Implements configured to receive power at the different PTO standards may be attached to their respective matching PTOs. (Typically, only one device would be attached at a time since simultaneous attachment of more than one device would tend to overload the tractor engine.) Therefore, operators of such agricultural vehicles have the option of attaching a variety of devices to the agricultural vehicles even though the devices themselves are designed to receive power by way of PTOs in only one (or another) of the various PTO standards.

One known flexible PTO output system employs interchangeable and removable PTOs. PTOs for operation at the three above-mentioned PTO standards (or other standards) are each designed to fit within the same PTO port on the agricultural vehicle. The PTO port may include an output sleeve (i.e., a cylinder with an internal cavity that is open at one end, into which different PTOs may be inserted) designed to interface with, support, and provide power to different PTOs, including PTOs of different sizes (e.g., 1⅜" and 1¾" PTOs). While able to receive and support different PTOs, the PTO port may also adjust power transmission characteristics based upon differences in the shapes or sizes of PTOs. In particular, the PTO port may be designed so that the speed of rotation (e.g., 540 RPM or 1000 RPM) of the output sleeve changes in dependence upon the shape or size of the PTO inserted therein.

Use of this type of PTO output system provides an operator with a great deal of flexibility in attaching various devices requiring different PTO standards to the agricultural vehicle (especially since the different PTOs are provided at the same physical location on the agricultural vehicle). It also provides special problems. First, implementation of this type of PTO system may require a set of supplementary parts and accessories to retain and support the different PTOs (in addition to the output sleeve) that must be added or removed by an operator as PTOs are interchanged. If the additional parts are too complicated, numerous, or physically unwieldy, they may limit the utility of this type of PTO system.

Further, since implements often place significant forces on the PTOs, there may be a tendency for the PTOs to be pulled out of the output sleeve or for undue stress to be placed upon other elements of the agricultural vehicle if these forces are communicated to the output sleeve. This may occur if, for example, the attached device is an implement that has been stored outdoors such that it has a soiled or rusted input shaft that does not smoothly slide on and off the PTO (and so communicates axial forces to the PTO). Additionally, since the different PTOs may have different diameters, lengths and shapes (and weights), the output sleeve may experience differing forces from the different PTOs. Further, to the extent the PTOs are of different lengths, the output sleeve may experience significantly different torques as varying devices are attached to the PTOs.

Also, because more than one PTO of more than one standard is implemented at one port, and because it may be appropriate for the PTO output system to act differently upon different PTOs (e.g., it may be appropriate to deliver less torque to smaller PTOs than to larger PTOs due to the lower maximum torque that smaller PTOs may bear), obtaining information as to which PTO is currently in use in the output sleeve becomes valuable.

Accordingly, it would be advantageous to have a PTO output system that was able to accommodate various interchangeable PTOs and yet provide for quick, easy replacement of one PTO with another. It would also be advantageous to provide a PTO system that securely retained the PTOs within the PTO port. It would further be advantageous to provide proper support for the PTOs and to limit the transfer of force to elements internal to the agricultural vehicle in such a way as to avoid damage to those internal elements.

SUMMARY OF THE INVENTION

The present invention relates to an apparatus for retaining a first and second PTO in longitudinal relation to an output sleeve in an agricultural vehicle. The output sleeve is for interchangeably supporting the first and second PTOs and for transmitting rotational power to the PTOs, and includes an outward protrusion proximate an end of the output sleeve. The apparatus includes an outer plate for retaining the first PTO in longitudinal relation to the output sleeve. The outer plate includes an outer plate aperture that allows the outer plate to be longitudinally positioned onto the first PTO behind a shoulder on the first PTO. The apparatus also includes an inner plate for coupling the outer plate to the output sleeve and thereby assisting in retaining the first PTO in longitudinal relation to the output sleeve. The inner plate includes an inner plate aperture that allows the inner plate to be longitudinally positioned onto the output sleeve, and an inward protrusion into the inner plate aperture that is capable of being moved longitudinally past the outward protrusion of the output sleeve as the inner plate is longitudinally positioned onto the output sleeve. The inward protrusion prevents removal of the inner plate from the output sleeve if, after the inward protrusion has been moved longitudinally past the outward protrusion, the inner plate is rotated with respect to the output sleeve so that the inward protrusion is in front of the outward protrusion. The apparatus further includes a fastener extending from the outer plate to the inner plate when the inward protrusion is in front of the outward protrusion and the outer plate is behind the shoulder. The fastener couples the outer plate to the inner plate.

The present invention further relates to an apparatus for retaining a first and second PTO in longitudinal relation to an output sleeve in an agricultural vehicle. The output sleeve is for interchangeably supporting the first and second PTOs and for transmitting rotational power to the PTOs, and includes an outward protrusion proximate an end of the output sleeve. The apparatus includes a bearing support assembly capable of being attached to and removed from the agricultural vehicle. The bearing support assembly retains the first PTO in longitudinal relation to the output sleeve and provides additional support to the first PTO. The bearing support assembly includes a housing assembly, a bearing sleeve, and a plurality of bearings. The housing assembly can be affixed to the agricultural vehicle. The bearing sleeve is to be longitudinally positioned onto the first PTO behind a shoulder on the first PTO, is in contact with the first PTO and provides support to the first PTO. The plurality of bearings allow rotational movement between the bearing sleeve and the housing assembly.

BRIEF DESCRIPTION OF THE DRAWINGS

FIG. 9 is a rear elevation view of a second type of PTO (e.g., a 1⅜" PTO for operation at 540 RPM) and surrounding components of a PTO retention system;

FIG. 10 is a sectional view of the PTO and components of FIG. 9, as well as certain other power delivery system components of the agricultural vehicle of FIG. 1 (shown in cut-away);

DETAILED DESCRIPTION OF THE INVENTION

Figure 1:
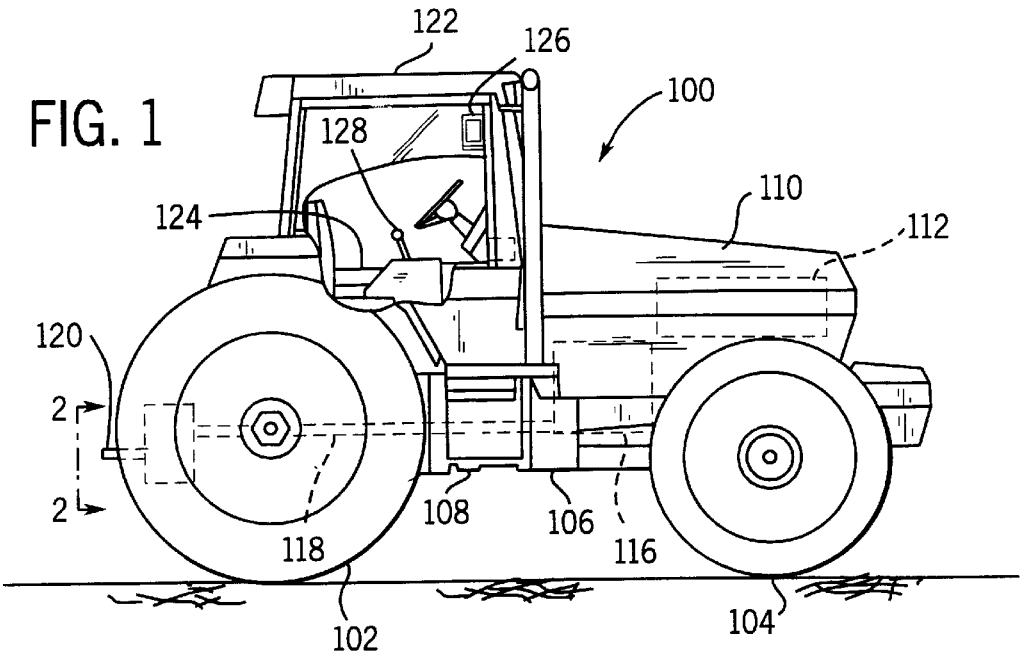
FIG. 1 is a side elevation view of an agricultural vehicle (e.g., a tractor) having a PTO.

Turning now to FIG. 1, a tractor 100 is shown, representative of agricultural vehicles such as the Case Corp. MU7 tractor. Tractor 100 has rear wheels 102, front wheels 104, a tractor frame 106 and a chassis 108. Tractor 100 also has an engine compartment 110 containing an engine or power plant 112 that powers, via a transmission 116 and a drive train 118, elements such as a PTO 120. Tractor 100 further has an operator cab 122, provided with a variety of instruments and input devices. Among these instruments and input devices are operator interfaces shown as an armrest control console 124, which supports many input devices (e.g., switches, levers, knobs), and a touch-sensitive video monitor or "touch screen" 126 capable of obtaining input signals from the operator and displaying visual information to the operator. Also provided in cab 122 is an auxiliary controller 128 for controlling elements of the hydraulic system such as one or more auxiliary valves (not shown).

As set forth below with respect to FIGS. 2–12, tractor 100 includes a generalized PTO retention system that allows three different PTOs (such as PTO 120), operating at three different PTO standards, to be employed on the tractor for delivery of power to various attached devices (not shown). As shown and described below, the PTOs (and standards) of interest are a 1¾" PTO 120 for operation at 1000 RPM (see FIGS. 2–8), a 1⅜" PTO 220 for operation at 540 RPM (see FIGS. 9–10 and 12), and another 1⅜" PTO 320 for operation at 1000 RPM (see FIG. 11). Although the PTO retention system as described is configured for operation with these three PTOs, in alternate embodiments the system could be modified for use with additional PTOs or other PTOs at different standards or having a different geometry.

Figure 2:
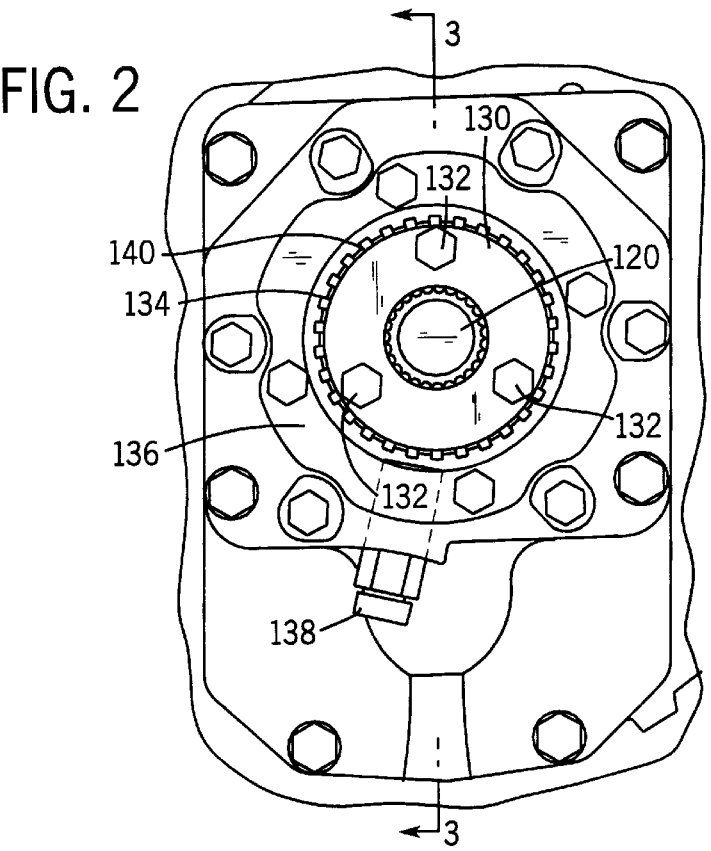
FIG. 2 is a rear elevation view of a first type of PTO (e.g., a 1¾" PTO for operation at 1000 RPM) and surrounding components of a PTO retention system, taken with respect to FIG. 1.

Turning to FIG. 2, a rear view of PTO 120 and surrounding elements of the PTO retention system on tractor 100 is shown. Elements of the PTO retention system include an outer plate 130, which (in combination with other elements to be described below) retains PTO 120 onto tractor 100. Outer plate 130 is secured to an inner plate 140 (shown more clearly in FIGS. 3–6) by way of three fasteners shown as three bolts 132 that are spaced at 120 degree intervals around the plates. In alternate embodiments, less than or more than three fasteners may be used, the fasteners may be spaced differently, or the fasteners may take other forms such as screws or spring-loaded clamps (not shown). Inner plate 140 has multiple sensing teeth 134, the rotation of which is sensed by a motion sensor 138, and thereby a quantity related to the rotational velocity (or frequency of rotation) of PTO 120 is sensed. Motion sensor 138 is shown positioned within a housing 136 that forms part of the structure of tractor 100 and that surrounds PTO 120 and plates 130 and 140. Motion sensor 138 is preferably a magnetic field sensor to sense the passage of metallic sensing teeth 134, but in alternate embodiments may also be any one of a variety of different types of sensors (e.g., a light sensor). Inner plate 140 is coupled to, and retains PTO 120 (via bolts 132 and outer plate 130) with respect to, an output sleeve 160 (which is shown in and described more fully with reference to FIG. 3). Output sleeve 160 is provided with rotational power from a power delivery system and communicates this power to PTO 120.

Figure 3:
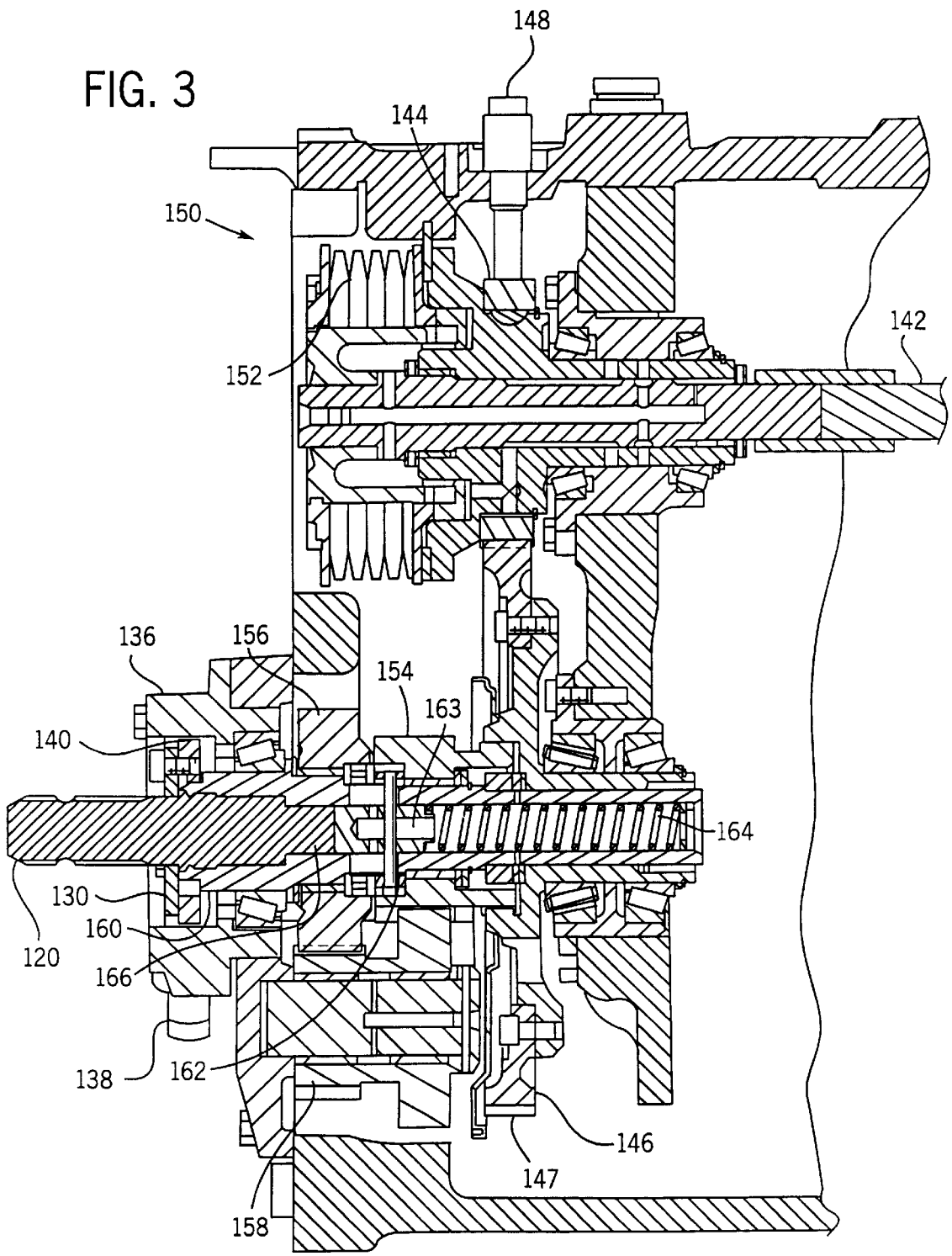
FIG. 3 is a sectional view of the PTO and components of FIG. 2, as well as additional power delivery system components of the agricultural vehicle of FIG. 1 that are coupled thereto (shown in cut-away)

Referring to FIG. 3, a sectional view of PTO 120 and surrounding components of the PTO retention system are shown (these elements are discussed more completely with reference to FIG. 4 below). In addition, one embodiment of a power delivery system for delivering power from engine 112 to the different PTOs (of the PTO retention system) is shown. The power delivery system includes a PTO drive shaft 142 that provides rotational power from engine 112 to elements of the PTO system. PTO drive shaft 142 is coupled to a PTO clutch 150 having multiple PTO clutch plates 152. PTO clutch 150 only transmits power to elements of the PTO retention system if the operator of tractor 100 engages the PTO clutch (i.e., causes the compressing of PTO clutch plates 152). Upon engagement of PTO clutch 150, power is communicated from the PTO clutch to a PTO clutch gear 144. PTO clutch gear 144 has 57 teeth (not shown). The rotation of PTO clutch gear 144 is detected by a second motion sensor 148, which in the present embodiment is a magnetic field sensor for sensing movement of the metallic teeth of the PTO clutch gear. (Although second motion sensor 148 is, in the present embodiment, substantially the same in design as motion sensor 138, in alternate embodiments the sensor may be a different type of sensor, e.g., a light sensor).

PTO clutch gear 144 is in contact with and transmits rotational power to a translation gear 146, which in the present embodiment has 125 gear teeth 147. Translation gear 146 in turn transmits the rotational power to a 1000 RPM gear 154 and also, via a cluster gear 158, to a 540 RPM gear 156. 1000 RPM gear 154 and 540 RPM gear 156 rotate, respectively, at approximately 1000 and 540 RPM, assuming that drive shaft 142 rotates at an expected rotational velocity of 2,222 RPM. 1000 RPM gear 154 and 540 RPM gear 156 provide, respectively, rotational power at 1000 RPM and 540 RPM to output sleeve 160. Whether output sleeve 160 receives power from 1000 RPM gear 154 and rotates at 1000 RPM or receives power from 540 RPM gear 156 and rotates at 540 RPM is determined by the position of a shift collar 162. Shift collar 162 may be positioned, by the operator of tractor 100, in either a forward position or a reverse position. As shown in FIG. 3 (and also in FIG. 11), shift collar 162 may be positioned in a forward position (relative to tractor 100) so that output sleeve 160 is coupled to 1000 RPM gear 154 and thus rotates at 1000 RPM. In contrast, as shown in FIG. 10, shift collar 162 may be positioned in a reverse position (relative to tractor 100) so that output sleeve 160 is coupled to 540 RPM gear 156 and thus rotates at 540 RPM. Shift collar 162 tends to be, in the absence of a PTO shaft, in the reverse position (for delivery of 540 RPM rotational power) due to pressure applied by a spring 164 (which is coupled to shift collar 162 by way of a shift piston 163). When PTO 120 is inserted into output sleeve 160, shift collar 162 is forced into the forward position by way of an elongated insertion shaft 166 on the PTO (the same is true with respect to PTO 320 shown in FIG. 11). In contrast, when a PTO without an elongated insertion shaft is inserted into output sleeve 160, shift collar 162 remains in the reverse position and consequently output sleeve 160 rotates at 540 RPM (as shown with respect to PTO 220 in FIG. 10).

Figure 4:
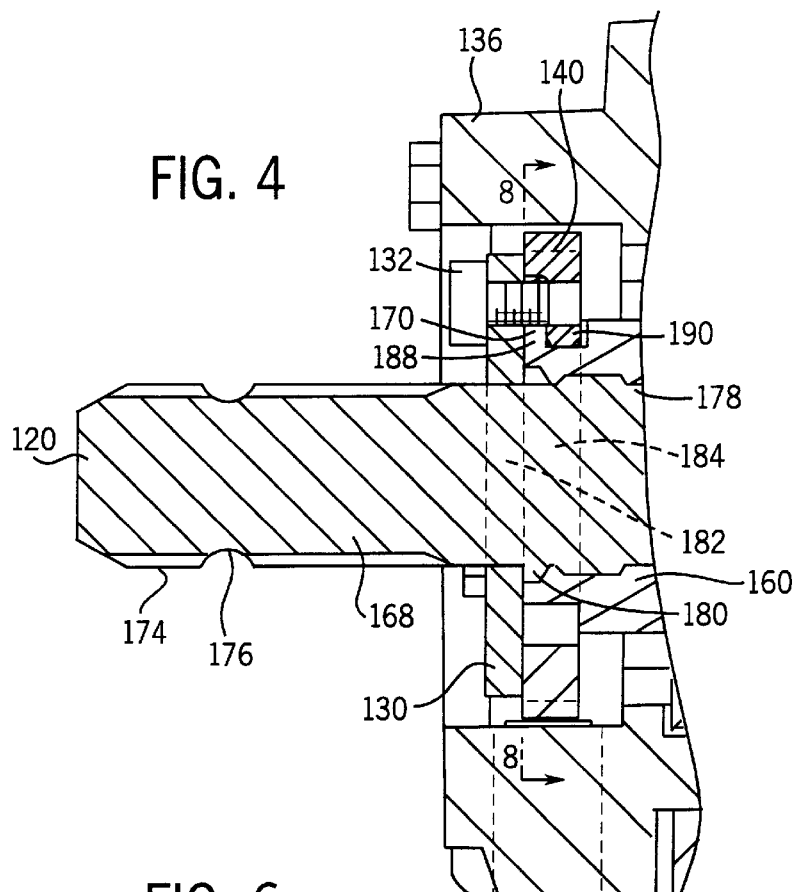
FIG. 4 is also a sectional view of the PTO and certain of the components of FIG. 2 (shown in cut-away)

Turning to FIG. 4, a sectional view of elements of the PTO retention system of FIGS. 2 and 3 is shown. (FIG. 4 is a magnified view of the elements of the PTO retention system shown in FIG. 3.) As shown, PTO 120 is inserted into output sleeve 160. PTO 120 is a 1¾" PTO for operation at 1000 RPM. Therefore (see FIG. 3), the PTO when inserted forces shift collar 162 into the forward position so that output sleeve 160 receives rotational power from 1000 RPM gear 154. PTO 120 has output splines 174 and a circumferential groove 176 located along an output end 168 so that the PTO may transmit rotational power and be attached to (in the longitudinal direction) an attached device (typically by way of a yoke). PTO 120 also has splines (not shown) on an input end 178 that, when the PTO is inserted into output sleeve 160, contact sleeve splines 183 within an internal cavity 181 of the output sleeve (see FIG. 7).

While the contact of sleeve splines 183 with the splines of input end 178 of PTO 120 allows output sleeve 160 to provide torque to the PTO to transmit rotational power, the friction between these splines is not sufficient to prevent longitudinal movement by the PTO within the output sleeve when significant force is exerted upon the PTO by attached devices. Indeed, the friction is designed to be relatively minimal so that an operator may manually remove PTO 120 and insert another PTO in its place. Consequently, outer plate 130, inner plate 140 and bolts 132 are necessary to retain PTO 120 within output sleeve 160, and act to retain the PTO as follows.

Outer plate 130 has an aperture 182 such that the outer plate may be positioned onto PTO 120 via output end 168. Aperture 182, while large enough to fit over output end 168, is not large enough so that outer plate 130 may be positioned beyond a retaining shoulder 180 on PTO 120. Therefore, once outer plate 130 is positioned against retaining shoulder 180, PTO 120 cannot move longitudinally past the outer plate in a reverse direction (relative to tractor 100). As stated above, outer plate 130 is secured to inner plate 140 by way of bolts 132 (or other fasteners). In the present embodiment, inner plate 140 has three threaded bolt receivers (holes) 186 for receiving bolts 132 and locking the bolts to the inner plate. As noted above, the number or types of fasteners used to secure inner plate 140 to outer plate 130 may vary in different embodiments, and therefore bolt receivers 186 as shown may or may not exist in other embodiments.

Figure 6:
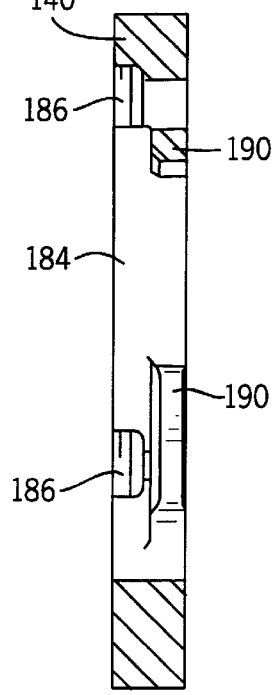
FIG. 6 is a sectional view of the inner plate of FIG. 5.
Figure 5:
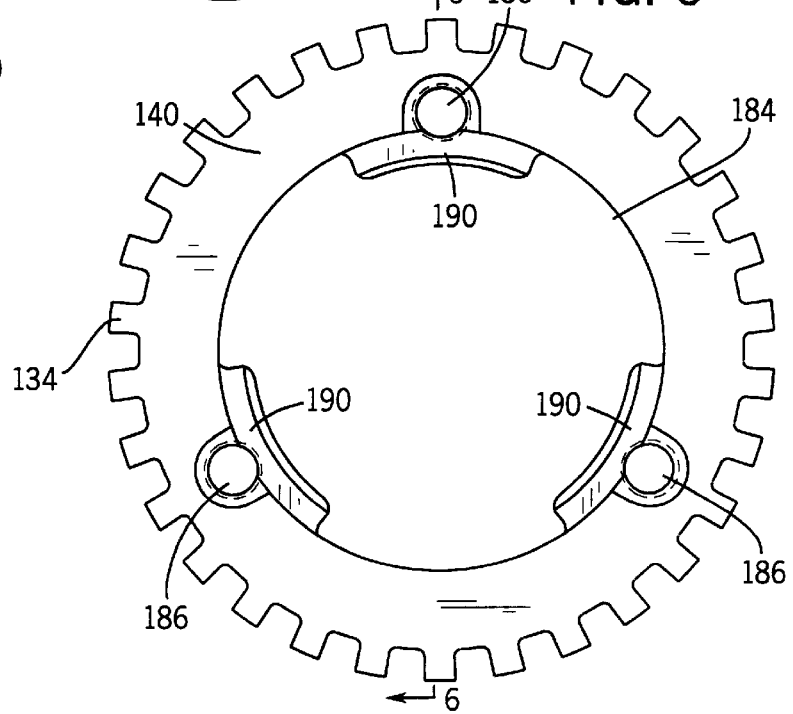
FIG. 5 is a top plan view of an inner plate.
Figure 7:
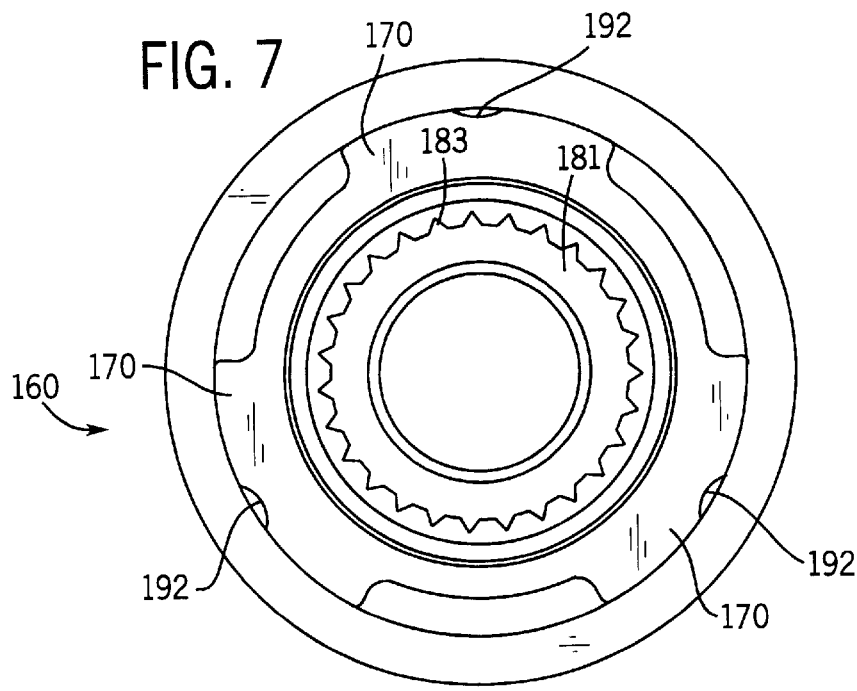
FIG. 7 is a rear elevation view of an output sleeve.

Inner plate 140 is, in turn, retained with respect to output sleeve 160 (the inner plate and output sleeve are shown in greater detail in FIGS. 5 and 6 and FIG. 7, respectively). As shown, output sleeve 160 includes protrusions 170 extending radially outward, which (as shown in FIG. 7) in the present embodiment are three in number, have generally rounded shape, and act as flanges (or teeth) off of an end 188 of the output sleeve. In alternate embodiments, output sleeve 160 may have fewer or more than three outward protrusions of the same or a different shape, and the outward protrusions may positioned differently on the output sleeve. Inner plate 140 has an aperture 184 so that the inner plate may be positioned, over end 188 of output sleeve 160, onto the output sleeve. Further, inner plate 140 has protrusions 190 extending radially inward into aperture 184. Inward protrusions 190 are designed so that inner plate 140 may be positioned onto output sleeve 160 and so that the inner plate (or at least the inward protrusions) may be moved past outward protrusions 170. Therefore, inward protrusions 190 are to some extent complementary in shape to outward protrusions 170 (or at least are smaller than the spaces left open between the outward protrusions). (In alternate embodiments, the number, shape or size of inward protrusions 190 may be modified from that shown.)

Figure 8:
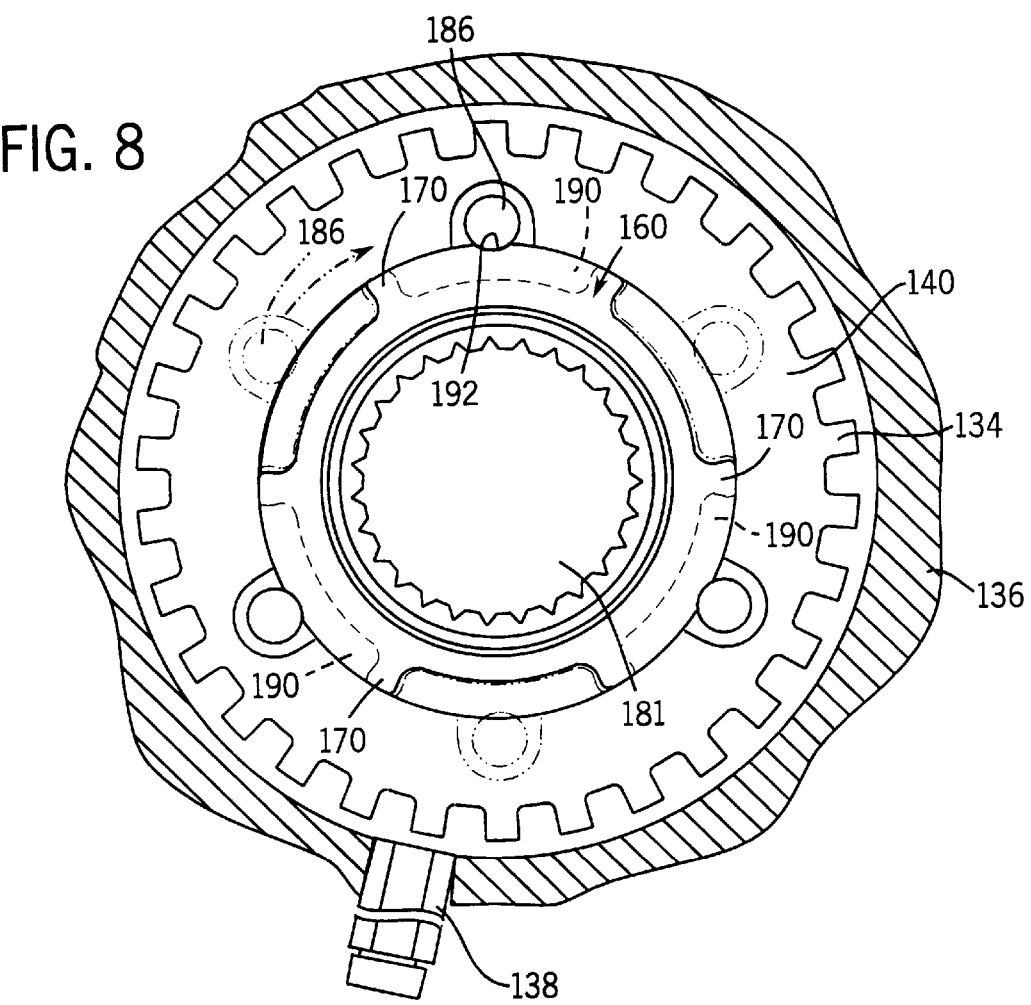
FIG. 8 is a sectional view of the PTO, inner plate and output sleeve, taken with reference to FIG. 4 (shown in cut-away)

Referring to FIG. 8, inner plate 140 becomes retained (in the longitudinal direction) by output sleeve 160 when, after inward protrusions 190 have been moved past outward protrusions 170, the inner plate is rotated with respect to the output sleeve so that the inward protrusions are in front of the outward protrusions. Although FIG. 8 shows rotation of inner plate 140 in the clockwise direction with respect output sleeve 160, rotation in either direction is sufficient in the present embodiment (in alternate embodiments, however, rotation may be limited to one or the other rotational directions). To maintain relative position between inward protrusions 190 and outward protrusions 170, despite the rotational movement of output sleeve 160 and inner plate 140, the inner plate is locked rotationally with respect to the output sleeve. Inner plate 140 is locked with respect to output sleeve 160 by having bolts 132 extend through notches 192 within outward protrusions 170 as the bolts extend from outer plate 130 to the inner plate (see also FIG. 7). In alternate embodiments, elements other than notches 192 could be used to lock inner plate 140 rotationally with respect to output sleeve 160 (e.g., outward protrusions 170 may be designed to have holes through which the bolts could pass).

In a preferred embodiment, inner plate 140 is designed to function as a weak link in the PTO retention system. That is, inner plate 140 (or portion of the inner plate, such as inward protrusions 190) are made of a weaker material or are of reduced thickness such that, if PTO 120 experiences excessive force (pulling the PTO away from tractor 100), the inner plate will break and allow the PTO to break free before the PTO itself, outer plate 130, output sleeve 160 or some other element breaks. While in the present embodiment inner plate 140 is provided as a weak link (because it is a low-cost, easily serviced element), in alternate embodiments another component may function as the weak link (e.g., outer plate 130 or bolts 132) or no weak link need be provided at all.

Figure 11:
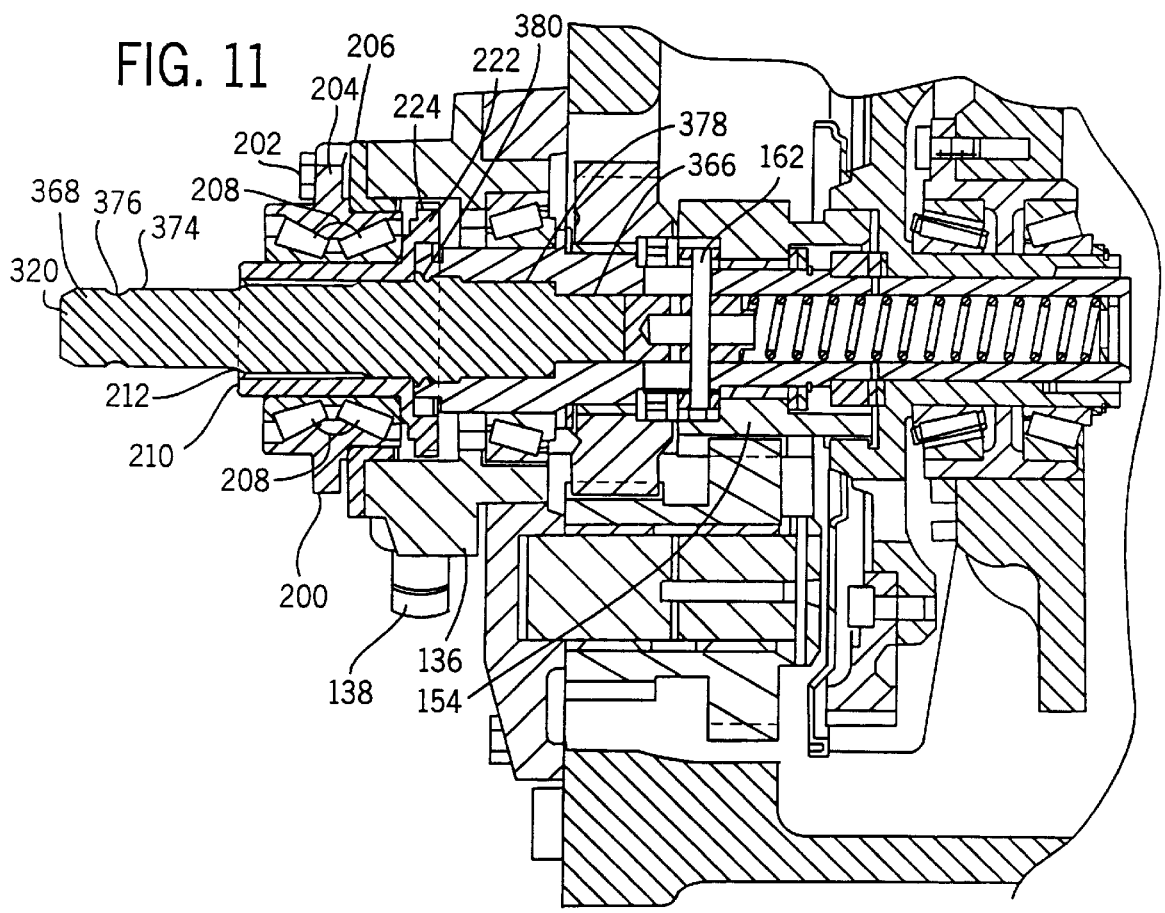
FIG. 11 is a sectional view of a third type of PTO (e.g., a 1⅜" PTO for operation at 1000 RPM) and surrounding components of a PTO retention system, as well as certain other power delivery system components of the agricultural vehicle of FIG. 1.
Figure 12:
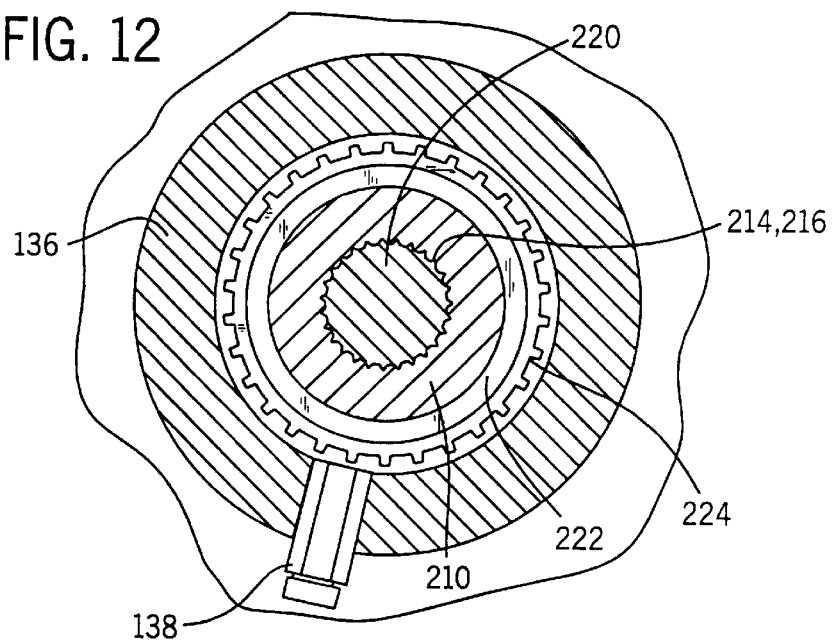
FIG. 12 is a sectional view of a bearing sleeve of a bearing support assembly and PTO, taken with respect to FIG. 10 (shown in cut-away).

Turning to FIGS. 9–12, views of second PTO 220 and third PTO 320 and surrounding elements of the PTO retention system on tractor 100 are shown. As shown in FIG. 9, a number of the elements of the PTO retention system that are used to retain PTOs 220 and 320 differ from those used to retain PTO 120. (Although FIG. 9 specifically shows a rear view of PTO 220 on tractor 100, and not PTO 320, the surrounding elements of the PTO retention system are identical for each of PTOs 220 and 320 in the present embodiment; only certain characteristics of the PTOs themselves differ, as set forth below. Also, the elements of the PTO power delivery system described above with respect to PTO 120 as shown in FIG. 3 remain as shown in FIG. 3 when PTOs 220 and 320, and the corresponding elements of the PTO retention system, are employed. Finally, although FIG. 12 is a sectional view that is taken with respect to FIG. 10, a sectional view that was taken from the analogous position in FIG. 11 would be identical.) In particular, outer plate 130, inner plate 140, and bolts 132 are not utilized in conjunction with PTOs 220 and 320. Instead, a bearing support assembly 200 is attached to housing 136 by way of four fasteners shown as four bolts 202. (In alternate embodiments, fewer or more than four bolts, or other fastening elements, may be used to attach bearing support assembly 200 to housing 136.) Bearing support assembly 200 acts both to retain PTOs 220 and 320 with respect to output sleeve 160 and to support the PTOs, as described below.

Referring to FIGS. 10 and 11, sectional views of PTOs 220 and 320, respectively, and surrounding elements of the PTO retention system are shown. PTOs 220 and 320 are both 1⅜" PTOs. However, PTO 220 is a 1⅜" PTO for operation at 540 RPM, while PTO 320 is a 1⅜" PTO for operation at 1000 RPM. That is, PTO 220 does not have an elongated insertion shaft (as described above with respect to PTO 120 in FIG. 3). Therefore, as shown in FIG. 10, shift collar 162 remains in a reverse position even when PTO 220 is inserted into output sleeve 160, such that the output sleeve receives rotational power from 540 RPM gear 156. In contrast, PTO 320 does have an elongated insertion shaft 366. Therefore, shift collar 162 is forced into a forward position when PTO 320 is inserted into output sleeve 160, such that the output sleeve receives rotational power from 1000 RPM gear 154.

Bearing support assembly 200 includes, in addition to bolts 202, a housing assembly 204, a piloting element 206, bearings 208 and a bearing sleeve 210. Housing assembly 204 is a stationary portion of bearing support assembly 200 that effectively forms an extension of housing 136 of tractor 100 when the housing assembly is attached to the housing by way of bolts 202. Housing assembly 204 and bearings 208, as shown in the present embodiment, are manufactured as a single unit (a "bearing assembly") by Timken Company of Canton, Ohio. Although in alternate embodiments housing assembly 204 may be directly attached to housing 136, in the present embodiment piloting element 206 rests in between the housing assembly and the housing (and is also attached to the housing by way of bolts 202). Piloting element 206 ensures that housing assembly 204 is properly aligned with respect to housing 136, so that bearing support assembly 200 will properly retain and support (and fit around) PTOs 220 and 320. In the present embodiment, piloting element 206 has the shape of a rounded flange although, in alternate embodiments, the piloting element could take other forms.

Within housing assembly 204 is bearing sleeve 210, which is freely rotatable with respect to the housing assembly by way of bearings 208. Although bearings 208 are in a taper roller bearing configuration, a different bearing configuration (with varying numbers or types of bearings) could be employed in alternate embodiments. Multiple bearings 208 are employed so that forces exerted by PTOs 220 and 320 are distributed evenly. Bearing sleeve 210 is press fit into bearing assembly 200, and has an internal cavity 212 within which is positioned either PTO 220 or PTO 320 when the respective PTO is within output sleeve 160 (and bearing support assembly 200 is attached to housing 136). Along the wall of internal cavity 212 are bearing sleeve splines 214 that contact support splines 216 of PTOs 220 or 320 (see FIG. 12). The contact between sleeve splines 214 and support splines 216 is between a clearance fit and a slight interference fit so that bearing sleeve 210 both supports the PTO (PTO 220 or PTO 320) and rotates along with the PTO. The support function of bearing support assembly 200 with respect to PTOs 220 and 320 is in contrast to the elements of the PTO retention system employed with respect to PTO 120. Additional support is required for PTOs 220 and 320, unlike PTO 120, insofar as PTOs 220 and 320 are 1⅜" PTOs having greater length and smaller diameters than PTO 120.

As with respect to PTO 120, PTOs 220 and 320 have retaining shoulders 280 and 380, respectively, by which the PTOs are retained with respect to output sleeve 160. As bearing support assembly 200 is attached to housing 136 and positioned over PTO 220 or PTO 320, bearing sleeve 210 abuts shoulder 280 or shoulder 380, respectively, and thereby provides longitudinal retention to the respective PTO. Also as with respect to PTO 120, motion sensor 138 is designed to sense a quantity related to the rotational speed of PTOs 220 and 320. In this case, motion sensor 138 senses the movement of teeth 224 located on a large diameter portion 222 of bearing sleeve 210, which is located in the same position relative to output sleeve 160 that inner plate 140 would be located if in use (see also FIG. 12). Further as with respect to PTO 120, PTOs 220 and 320 have output splines 274 and 374 and circumferential grooves 276 and 376 located along output ends 268 and 368, respectively, so that the PTOs may transmit rotational power and be coupled to an attached device (again, typically by way of a yoke). Additionally, PTOs 220 and 320 have splines (not shown) on input ends 278 and 378, respectively, that contact sleeve splines 183 within internal cavity 181 of output sleeve 160 when the PTOs are inserted into the output sleeve (as shown in FIG. 7). While output splines 174, 274 and 374 differ in size and spacing in the present embodiment (as is typically done in industry to preclude attached devices from being attached to the wrong PTOs), the splines of the PTOs on input ends 178, 278 and 378 are identical since each PTO must interface with the same output sleeve 160.

It should be noted that the components of the PTO retention system used in conjunction with PTOs 220 and 320 do not require a weak link comparable to that of inner plate 140 (used with PTO 120). A weak link is not needed with respect to PTOs 220 and 320, not only because these PTOs, as 1⅜" PTOs, tend to experience less outward force from attached devices than does a 1¾" PTO (such as PTO 120), but also because in the present embodiment any axial force experienced by PTOs 220 and 320 is communicated via bearing support assembly 200 to housing 136 rather than to output sleeve 160.

The PTO retention system shown in FIGS. 2–12 has multiple advantages. First, the PTO retention system facilitates the delivery of rotational power to attached devices at three different PTO standards (including operation at two different speeds). Interchanging from one PTO standard to a second PTO standard requires little effort on the part of an operator. For example, to switch from the PTO standard of PTO 120 (1¾" PTO for operation at 1000 RPM) to that of PTO 220 (1⅜" PTO for operation at 540 RPM), an operator need only remove bolts 132 from outer and inner plates 130 and 140, remove the outer and inner plates (including rotation of inward protrusions 190 of the inner plate with respect to outward protrusions 170 of output sleeve 160 to allow removal of the inner plate), remove PTO 120 from output sleeve 160, insert PTO 220 into the output sleeve, position bearing support assembly 200 onto PTO 220, and attach the bearing support assembly (along with piloting element 206) onto housing 136 with bolts 202. Further, the number of supplementary parts that must be stored while a given PTO is in use is minimal. While PTO 120 is in use, only bearing support assembly 200 (along with piloting element 206), bolts 202, and PTOs 220 and 320 need be stored, and while PTO 220 or PTO 320 is in use, only outer plate 130, inner plate 140, bolts 132, PTO 120 and either PTO 320 or PTO 220, respectively, need be stored.

Second, the present PTO retention system provides significant and appropriate retention for PTOs 120, 220, and 320. In particular, the system provides a weak link (failsafe) mechanism protecting the internal componentry of tractor 100 from excessive forces applied to PTO 120, and diverts excessive forces that may be applied to PTOs 220 and 320 away from the more sensitive internal components of the tractor and toward the more robust housing structure of the tractor. Third, the present PTO retention system provides substantial additional support to 1⅜" PTOs 220 and 320 via bearing support assembly 200.

Fourth, the present PTO retention system provides a mechanism by which tractor 100 may automatically sense which PTO among PTOs 120, 220 and 320 is currently in use, and the speed at which the PTO in use is rotating. By sensing the movement of teeth 134 and 224 on inner plate 140 and bearing sleeve 210 (specifically, large diameter portion 222 on the bearing sleeve), respectively, sensor 138 can provide data which, when combined with data obtained from sensor 148, is indicative of both the PTO that is currently in use and the speed at which the PTO is rotating. Distinguishing between PTO 120 and PTO 320 (which are both designed to rotate at 1000 RPM) is possible if teeth 134 differ from teeth 224 in number (or some other measurable characteristic). This data may be used, for example, to control torque limiting, or to provide operator indicator information. Finally, the present PTO retention system meets, and utilizes PTOs that meet, all relevant industry standards.

Although only a few exemplary embodiments of this invention have been described above, those skilled in the art will appreciate that many modifications are possible in the exemplary embodiments without materially departing from the novel teachings and advantages of this invention. While the above discussion has principally focused on embodiments of tractor 100, it should be readily appreciated that these embodiments are exemplary and can be readily modified for use in a variety of vehicles that utilize PTOs. While the present PTO retention system is described in conjunction with PTOs 120, 220 and 320, the system could be easily modified for use with additional PTOs having different geometries (including different lengths, diameters or numbers of splines) or for use at different rotational speeds. For example, the system could be used with a fourth, 1¾" PTO designed to rotate at 540 RPM. Accordingly, all such modifications are intended to be included within the scope of the invention as defined in the claims. Other substitutions, modifications, changes and omissions may be made in the design, operating conditions and arrangement of preferred and alternative embodiments without departing from the spirit of the invention as expressed in the appended claims.

What is claimed is:

1. In an agricultural vehicle having an output sleeve for interchangeably supporting a first PTO and a second PTO and for transmitting rotational power thereto, and wherein the output sleeve includes an outward protrusion proximate an end of the output sleeve, an apparatus for retaining the first and second PTOs in longitudinal relation to the output sleeve comprising:

an outer plate for retaining the first PTO in longitudinal relation to the output sleeve, the outer plate including an outer plate aperture that allows the outer plate to be longitudinally positioned onto the first PTO behind a shoulder on the first PTO;

an inner plate for coupling the outer plate to the output sleeve and thereby assisting in retaining the first PTO in longitudinal relation to the output sleeve, the inner plate including an inner plate aperture that allows the inner plate to be longitudinally positioned onto the output sleeve, the inner plate further including an inward protrusion into the inner plate aperture that is capable of being moved longitudinally past the outward protrusion of the output sleeve as the inner plate is longitudinally positioned onto the output sleeve, wherein the inward protrusion prevents removal of the inner plate from the output sleeve if, after the inward protrusion has been moved longitudinally past the outward protrusion, the inner plate is rotated with respect to the output sleeve so that the inward protrusion is in front of the outward protrusion; and a fastener extending from the outer plate to the inner plate when the inward protrusion is in front of the outward protrusion and the outer plate is behind the shoulder, the fastener coupling the outer plate to the inner plate.

2. The apparatus of claim 1, wherein the outward protrusion of the output sleeve includes a notch, the fastener extends from the outer plate through the notch of the outward protrusion to the inner plate when the inward protrusion is in front of the outward protrusion, and rotation of the inner plate with respect to the output sleeve is prevented because of the positioning of the fastener through the notch.

3. The apparatus of claim 1, wherein the inner plate is a weak link so that, if an excessive external force is placed on the first PTO, the inner plate breaks and thereby prevents the excessive force from being transmitted to the output sleeve.

4. The apparatus of claim 1, wherein the first PTO is a one and three-quarter inch PTO for operation at one thousand RPM.

5. The apparatus of claim 1, wherein the output sleeve further comprises a second outward protrusion proximate the end of the output sleeve, and wherein the inner plate further comprises a second inward protrusion into the inner plate aperture that is capable of being moved longitudinally past the outward protrusions of the output sleeve as the inner plate is longitudinally positioned onto the output sleeve.

6. The apparatus of claim 1, wherein the inner plate further comprises a plurality of teeth along an outer circumference of the inner plate, the teeth for allowing sensing of the rotation of the inner plate and the first PTO.

7. The apparatus of claim 1, wherein the inner plate includes a fastener receiver for receiving the fastener, by which the fastener may be attached to the inner plate.

8. The apparatus of claim 7, wherein the fastener is a bolt that extends through the outer plate and into the fastener receiver, the bolt and the fastener receiver both being threaded so that the bolt may be tightened into the fastener receiver.

9. In an agricultural vehicle having an output sleeve for interchangeably supporting a first PTO and a second PTO and for transmitting rotational power thereto, and wherein the output sleeve includes an outward protrusion proximate an end of the output sleeve, an apparatus for retaining the first and second PTOs in longitudinal relation to the output sleeve comprising:
   a bearing support assembly capable of being attached to and removed from the agricultural vehicle, the bearing support assembly for retaining the first PTO in longitudinal relation to the output sleeve and for providing additional support to the first PTO, the bearing support assembly comprising
      a housing assembly capable of being affixed to the agricultural vehicle,
      a bearing sleeve to be longitudinally positioned onto the first PTO behind a shoulder on the first PTO, the bearing sleeve in contact with the first PTO and providing support thereto, and
      a plurality of bearings for allowing rotational movement between the bearing sleeve and the housing assembly.

10. The apparatus of claim 9, wherein the bearing support assembly further includes a piloting element disposed between the housing assembly and the agricultural vehicle for positioning the bearing support assembly relative to the agricultural vehicle.

11. The apparatus of claim 9, wherein the housing assembly further includes a fastener for removably affixing the housing assembly to the agricultural vehicle.

12. The apparatus of claim 9, wherein the first PTO is a one and three-eighth inch PTO.

13. The apparatus of claim 9, wherein the bearing sleeve includes a plurality of sleeve splines along an inner surface of a cavity within the bearing sleeve for interlocking with a plurality of PTO splines along the first PTO when the bearing sleeve is longitudinally positioned onto the first PTO, so that the bearing sleeve when so positioned rotates at the same speed as the first PTO.

14. The apparatus of claim 9, wherein the bearing sleeve includes a large diameter portion that is proximate the output sleeve when the bearing sleeve is longitudinally positioned onto the first PTO behind the shoulder on the first PTO, the large diameter portion comprising a plurality of teeth along an outer circumference of the large diameter portion, the teeth for allowing sensing of the rotation of the bearing sleeve and the first PTO.

15. The apparatus of claim 9, further comprising an alternate assembly to be used in place of the bearing support assembly for retaining the second PTO in longitudinal relation to the output sleeve, the alternate assembly comprising:
   an outer plate for retaining the second PTO in longitudinal relation to the output sleeve, the outer plate including an outer plate aperture that allows the outer plate to be longitudinally positioned onto the second PTO behind a shoulder on the second PTO;
   an inner plate for coupling the outer plate to the output sleeve and thereby assisting in retaining the second PTO in longitudinal relation to the output sleeve, the inner plate including an inner plate aperture that allows the inner plate to be longitudinally positioned onto the output sleeve, the inner plate further including
      an inward protrusion into the inner plate aperture that is capable of being moved longitudinally past the outward protrusion of the output sleeve as the inner plate is longitudinally positioned onto the output sleeve,
      wherein the inward protrusion prevents removal of the inner plate from the output sleeve if, after the inward protrusion has been moved longitudinally past the outward protrusion, the inner plate is rotated with respect to the output sleeve so that the inward protrusion is in front of the outward protrusion; and
   a fastener extending from the outer plate to the inner plate when the inward protrusion is in front of the outward protrusion and the outer plate is behind the shoulder, the fastener coupling the outer plate to the inner plate.

16. The apparatus of claim 15, wherein the outward protrusion of the output sleeve includes a notch, the fastener extends from the outer plate through the notch of the outward protrusion to the inner plate when the inward protrusion is in front of the outward protrusion, and rotation of the inner plate with respect to the output sleeve is prevented because of the positioning of the fastener through the notch.

17. The apparatus of claim 15, wherein the inner plate further comprises a plurality of teeth along an outer circumference of the inner plate, the teeth for allowing sensing of the rotation of the inner plate and the second PTO.

18. The apparatus of claim 15, wherein the first PTO is a one and three-eighth inch PTO and the second PTO is a one and three-quarter inch PTO, and each of the PTOs is for operation at one thousand RPM.

19. The apparatus of claim 15, wherein the first PTO is a one and three-eighth inch PTO for operation at five hundred and forty RPM and the second PTO is a one and three-quarter inch PTO for operation at one thousand RPM.

20. The apparatus of claim 19, wherein the apparatus is configured to retain a third PTO, the third PTO being a one and three-eighth inch PTO for operation at one thousand RPM, and wherein the bearing support assembly is also used for retaining and supporting the third PTO when the third PTO is located at the output sleeve and the bearing support assembly is attached to the agricultural vehicle such that the bearing sleeve is longitudinally positioned onto the third PTO behind a shoulder on the third PTO.

21. The apparatus of claim 20,
   wherein the inner plate further comprises a plurality of teeth along an outer circumference of the inner plate, the teeth for allowing sensing of the rotation of the inner plate and the second PTO;
   wherein the bearing sleeve includes a large diameter portion that is proximate the output sleeve when the bearing sleeve is longitudinally positioned onto one of the first and third PTOs behind the shoulder of the respective PTO and the respective PTO is located at the output sleeve, the large diameter portion comprising a plurality of teeth along an outer circumference of the large diameter portion, the teeth for allowing sensing of the rotation of the bearing sleeve and the respective PTO; and wherein the identity and rotational speed of the first, second and third PTOs may be determined from sensing allowed by the teeth of the inner plate and the large diameter portion.

22. In an agricultural vehicle, a system for interchangeably retaining a first, second and third PTO with respect to the agricultural vehicle, the system comprising:

an output sleeve for supporting the interchangeable first, second and third PTOs, the output sleeve including an outward protrusion proximate an end of the output sleeve, an outer plate for retaining the first PTO in longitudinal relation to the output sleeve, the outer plate including an outer plate aperture that allows the outer plate to be longitudinally positioned onto the first PTO behind a shoulder on the first PTO;

an inner plate for coupling the outer plate to the output sleeve and thereby assisting in retaining the first PTO in longitudinal relation to the output sleeve, the inner plate including an inner plate aperture that allows the inner plate to be longitudinally positioned onto the output sleeve, the inner plate further including a plurality of teeth along an outer circumference of the inner plate, and an inward protrusion into the inner plate aperture that is capable of being moved longitudinally past the outward protrusion of the output sleeve as the inner plate is longitudinally positioned onto the output sleeve, wherein the inward protrusion prevents removal of the inner plate from the output sleeve if, after the inward protrusion has been moved longitudinally past the outward protrusion, the inner plate is rotated with respect to the output sleeve so that the inward protrusion is in front of the outward protrusion; and a fastening means for coupling the outer plate to the inner plate and for preventing rotation of the inner plate with respect to the output sleeve.

23. The system of claim 22, further comprising:

a bearing support assembly capable of being attached to and removed from the agricultural vehicle, the bearing support assembly for retaining the second and third PTOs in longitudinal relation to the output sleeve and for providing additional support to the second and third PTOs, the bearing support assembly comprising a housing assembly capable of being affixed to the agricultural vehicle, a bearing sleeve to be longitudinally positioned onto the second and third PTOs behind a shoulder on the respective PTO, the bearing sleeve being in contact with the respective PTO and providing support thereto, and a plurality of bearings for allowing rotational movement between the bearing sleeve and the housing assembly, wherein the bearing sleeve further includes a large diameter portion that is proximate the output sleeve when the bearing sleeve is longitudinally positioned onto the second and third PTOs behind the shoulder of the respective PTO and the respective PTO is located at the output sleeve, the large diameter portion comprising a plurality of teeth along an outer circumference of the large diameter portion.

24. The system of claim 23, further comprising a first sensor positioned near the output sleeve and capable of sensing motion of the plurality of teeth of the large diameter portion and the inner plate.

25. The system of claim 24, further comprising a second sensor for sensing an input rotational speed, wherein the system compares the sensed motion of the teeth with the sensed input rotational speed to determine which of the first, second and third PTOs is currently in use.

26. The system of claim 24, further comprising a second sensor for sensing an input rotational speed, wherein the system compares the sensed motion of the teeth with the sensed input rotational speed to determine the speed of the PTO that is currently in use.

27. In an agricultural vehicle having an output sleeve for interchangeably supporting a first PTO and a second PTO and for transmitting rotational power thereto, and wherein the output sleeve includes an outward protrusion proximate an end of the output sleeve, a method of retaining the first and second PTOs in longitudinal relation to the output sleeve comprising the steps of:

longitudinally positioning an outer plate onto the first PTO behind a shoulder on the first PTO;

longitudinally positioning an inner plate onto the output sleeve so that an inward protrusion into an inner plate aperture of the inner plate is moved longitudinally past the outward protrusion of the output sleeve;

rotating the inner plate with respect to the output sleeve so that the inward protrusion is in front of the outward protrusion; and coupling the inner plate to the outer plate by extending a fastener from the outer plate to the inner plate.

28. The method of claim 27, further comprising the step of sensing a quantity related to the rotational speed of the first PTO by sensing the rotation of the inner plate and utilizing the sensed quantity to determine the identity of the first PTO.

29. In an agricultural vehicle having an output sleeve for interchangeably supporting a first PTO and a second PTO and for transmitting rotational power thereto, and wherein the output sleeve includes an outward protrusion proximate an end of the output sleeve, a method of retaining the first and second PTOs in longitudinal relation to the output sleeve comprising the steps of:

longitudinally positioning a bearing sleeve of a bearing support assembly onto the first PTO so that the bearing sleeve is positioned behind a shoulder of the first PTO and so that the first PTO is supported by the bearing sleeve;

attaching a housing assembly of the bearing support assembly to the agricultural vehicle; and allowing rotational movement between the bearing sleeve and the housing assembly by way of a plurality of bearings.

30. The method of claim 29, further comprising the step of sensing a quantity related to the rotational speed of the first PTO by sensing the rotation of a large diameter portion of the sleeve, and utilizing the sensed quantity to determine the identity of the first PTO.

* * * * *